US012639226B2

(12) United States Patent
Ma et al.

(10) Patent No.: US 12,639,226 B2
(45) Date of Patent: May 26, 2026

(54) IMAGE DATA PROCESSING METHOD AND APPARATUS, AND STORAGE MEDIUM

(71) Applicant: ZHEJIANG UNIVIEW TECHNOLOGIES CO., LTD., Hangzhou (CN)

(72) Inventors: Longfei Ma, Hangzhou (CN); Pengguo Zhang, Hangzhou (CN); Yuguang Yuan, Hangzhou (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 18/845,334

(22) PCT Filed: Dec. 28, 2022

(86) PCT No.: PCT/CN2022/142611
§ 371 (c)(1),
(2) Date: Sep. 9, 2024

(87) PCT Pub. No.: WO2023/169060
PCT Pub. Date: Sep. 14, 2023

(65) Prior Publication Data
US 2025/0181511 A1     Jun. 5, 2025

(30) Foreign Application Priority Data

Mar. 11, 2022    (CN) .......................... 202210239330.0

(51) Int. Cl.
*G06F 12/00*     (2006.01)
*G06F 12/0875*     (2016.01)
*G06T 1/60*     (2006.01)

(52) U.S. Cl.
CPC ............ *G06F 12/0875* (2013.01); *G06T 1/60* (2013.01); *G06F 2212/455* (2013.01)

(58) Field of Classification Search
CPC .......... G06F 12/0875; G06F 2212/455; G06F 13/1668; G06F 12/0831; G06F 12/0893;
(Continued)

(56) References Cited

U.S. PATENT DOCUMENTS

| | | | | |
|---|---|---|---|---|
| 10,706,813 | B1 * | 7/2020 | Fruchter ................. | G06F 3/012 |
| 10,771,726 | B2 * | 9/2020 | Wang ................. | H04N 1/00095 |
| 2011/0131374 | A1 | 6/2011 | Noeldner et al. | |
| 2015/0248741 | A1 * | 9/2015 | Iranli ........................ | G06T 1/60 |
| | | | | 345/557 |

(Continued)

FOREIGN PATENT DOCUMENTS

| | | | | |
|---|---|---|---|---|
| CN | 100466608 C | * | 3/2009 | ............. H04L 47/10 |
| CN | 106973188 A | | 7/2017 | |

(Continued)

OTHER PUBLICATIONS

International Search Report in Application No. PCT/CN2022/142611, dated Mar. 22, 2023, 4 pages, including translation.
(Continued)

*Primary Examiner* — Shawn X Gu
*Assistant Examiner* — Mohammad S Hasan
(74) *Attorney, Agent, or Firm* — MASCHOFF BRENNAN

(57) ABSTRACT

Provided are an image data processing method and apparatus and a storage medium. The image data processing method includes acquiring an image; in the case where the image does not need to be segmented, caching the image frame by frame; and forming data of the image cached frame by frame into data packets frame by frame and sending the data packets.

20 Claims, 7 Drawing Sheets

(58) Field of Classification Search
CPC .............. G06F 2213/0026; G06T 1/60; H04N 1/32363
See application file for complete search history.

(56) References Cited

U.S. PATENT DOCUMENTS

| | | | |
|---|---|---|---|
| 2020/0134795 A1* | 4/2020 | Zhang .................... | H04N 23/60 |
| 2023/0134412 A1* | 5/2023 | Zhang ................ | G06F 13/4282 710/100 |

FOREIGN PATENT DOCUMENTS

| | | | | |
|---|---|---|---|---|
| CN | 108550103 A | * | 9/2018 | .............. G06T 1/60 |
| CN | 110073653 A | * | 7/2019 | .............. H04N 5/14 |
| CN | 110971387 A | | 4/2020 | |
| CN | 112449137 A | * | 3/2021 | ............. H04N 23/60 |
| CN | 114286035 A | * | 4/2022 | ......... G06F 13/4009 |
| EP | 3313083 A1 | | 4/2018 | |
| JP | 5147430 B2 | * | 2/2013 | |
| JP | 2020160828 A | | 10/2020 | |

OTHER PUBLICATIONS

FPGA Technology World, (Non-official translation), "FPGA Design Experience: Image Processing", https://blog.csdn.net/qq_40310273/article/details/105678708, Apr. 22, 2020, pp. 1-3.
Extended European Search Report for Application No. 22930679.0, dated Feb. 19, 2026, 10 pages.

* cited by examiner

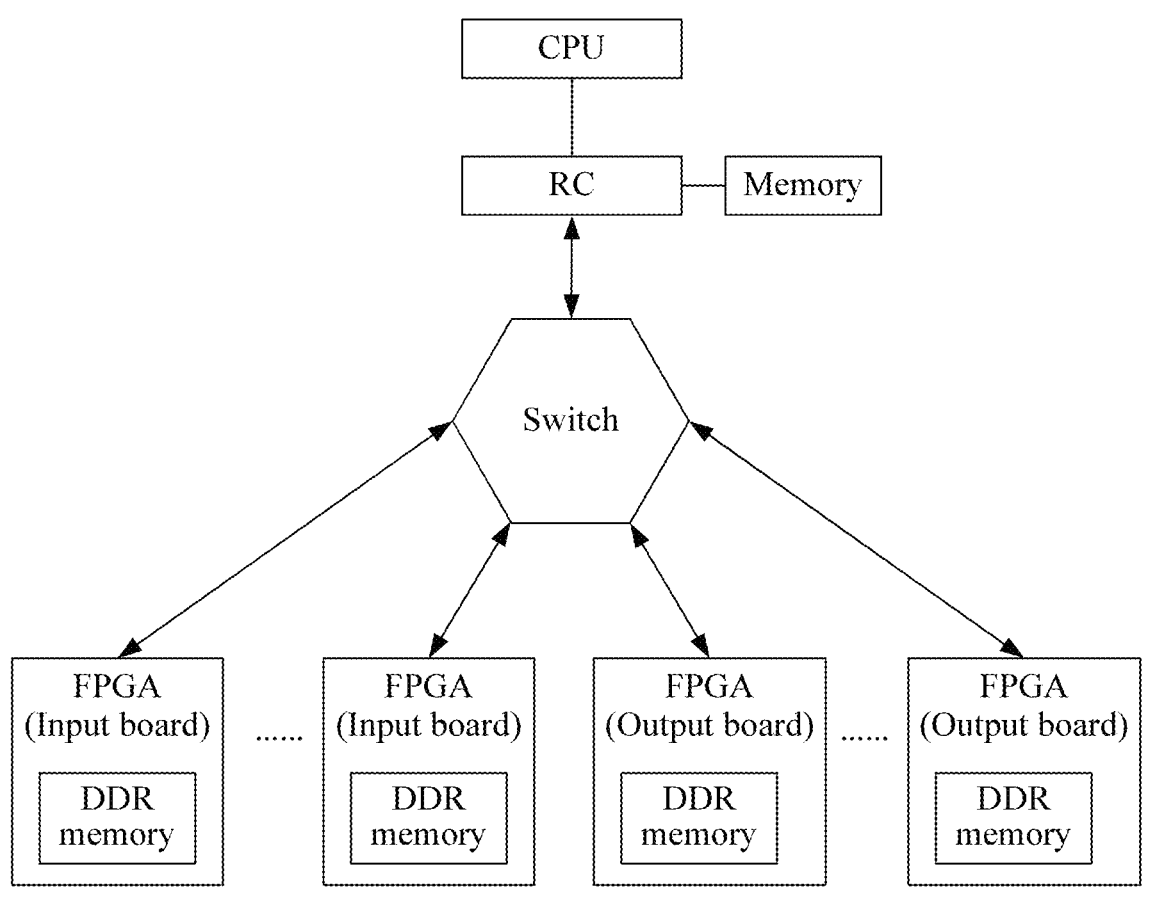
FIG. 1
FIG. 2
FIG. 3

IMAGE DATA PROCESSING METHOD AND APPARATUS, AND STORAGE MEDIUM

This application is a national stage application filed under 35 U.S.C. 371 based on International Patent Application No. PCT/CN2022/142611, filed on Dec. 28, 2022, which claims priority to Chinese Patent Application No. 202210239330.0 filed with the China National Intellectual Property Administration (CNIPA) on Mar. 11, 2022, the disclosure of which is incorporated herein by reference in its entirety, the disclosures of which are incorporated herein by reference in their entireties.

TECHNICAL FIELD

The present application relates to image processing technologies, for example, an image data processing method and apparatus and a storage medium.

BACKGROUND

As shown in FIG. 1, a splicing control device based on the Peripheral Component Interconnect Express (PCIe) architecture includes a central processing unit (CPU), a switch, input boards, and output boards. The CPU is connected to a root complex (RC), the RC is connected to the switch and the memory, and the switch is connected to the input boards and the output boards. In some cases, the input boards and the output boards are implemented using field-programmable gate arrays (FPGAs). The CPU initializes and configures the PCIe device (the switch, the input boards, the output boards, and the like) through the RC. In some cases, the communication between the CPU, the input boards, and the output boards are achieved through transaction layer packets (TLPs). The input boards implement the functions of image acquisition, caching, image reduction, and image segmentation and send the acquired image data to the output boards through PCIe. The output boards implement the functions of image caching, magnification, stacking, and display. The CPU completes the service management and scheduling of the input boards and the output boards.

SUMMARY

The embodiments of present application provide an image data processing method and apparatus and a storage medium, thereby improving bandwidth utilization.

The embodiments of present application provide an image data processing method. The method includes the steps below. An image is acquired. In the case where the image does not need to be segmented, the image is cached frame by frame. Data of the image cached frame by frame is formed into data packets frame by frame and the data packets are sent.

The embodiments of present application provide an image data processing method. The method includes the steps below. An image is received. In the case where the image needs to be spliced and is processed frame by frame, the frame-by-frame processed image is split line by line to generate line-by-line processed images; and the line-by-line processed images generated by splitting are spliced.

BRIEF DESCRIPTION OF DRAWINGS

FIG. 1 is a schematic diagram of a splicing control system of the PCIe architecture according to some embodiments of the present application.

FIG. 2 is a schematic diagram of line-by-line processing according to some embodiments of the present application.

FIG. 3 is a schematic diagram of frame-by-frame processing according to some embodiments of the present application.

DETAILED DESCRIPTION

The present application describes multiple embodiments, but the description is exemplary.

Furthermore, in describing representative embodiments, the specification may have presented the method and/or process as a particular sequence of steps. However, to the extent that the method or process does not rely on the particular sequence of steps described herein, the method or process should not be limited to the particular sequence of steps described. As those of ordinary skill in the art understand, other sequences of steps are feasible.

In the traditional splicing control system, acquisition, caching, scaling, and image sending of the input boards are totally performed line by line, and image receiving, caching, scaling, and display of the output boards are also performed line by line, which is conducive to image segmenting, caching, scaling, and image splicing. However, the disadvantages are obvious. Since multiple modules perform image line-by-line processing, the bandwidth utilization of modules such as the caching module, the image sending module, and the image receiving module is inevitably reduced. For example, the more fragmented the image is segmented, the lower the bandwidth utilization is, affecting the performance of the product.

For the external interfaces, such as the Double Data Rate Synchronous Dynamic Random-Access Memory (DDR SDRAM) and PCIe, the larger the burst length of the sent and received data, the higher the bandwidth utilization. The embodiments of the present application propose an image data processing method, the image does not need to be segmented or spliced are processed frame by frame, thereby improving the bandwidth utilization.

FIG. 2 is a schematic diagram of line-by-line processing according to some embodiments of the present application. As shown in FIG. 2, one frame of the image includes N lines: Line 0 to Line N-1. Each line includes a start of line (sol), an end of line (eol), and the data of the line. The start of line of the first line (Line 0) is a start of frame (sof), and the end of line of the last line (Line N-1) is an end of frame (eof).

FIG. 3 is a schematic diagram of frame-by-frame processing according to some embodiments of the present application. As shown in FIG. 3, the data of the next line is spliced to the end of the data of the current line; with one frame as a unit, the frame includes N lines of content, including the start of frame (sof) and the end of frame (eof), but not including the start of line (sol) and the end of line (eol). The data to be spliced in each line does not include the preceding start of line (sol) and the preceding end of line (eol).

Figure 4:
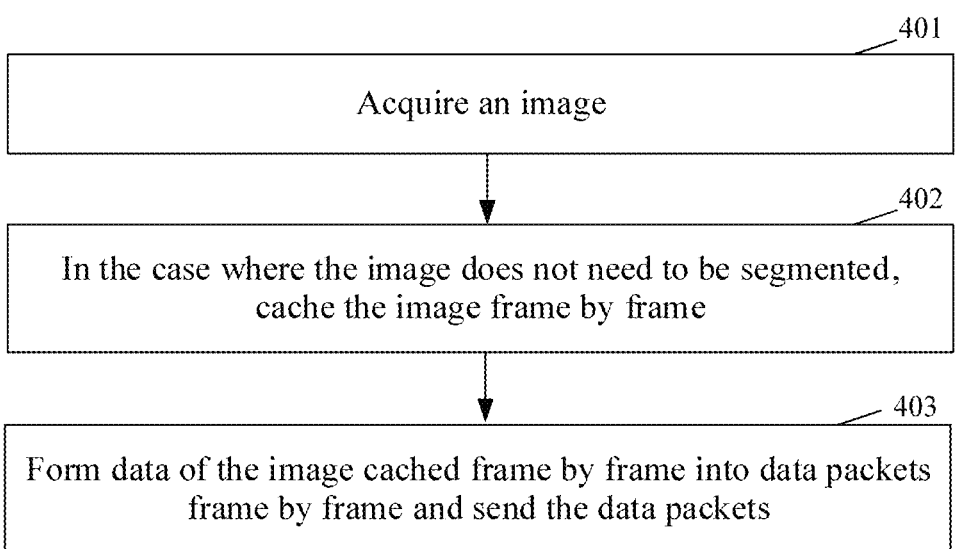
FIG. 4 is a flowchart of an image data processing method according to some embodiments of the present application.

FIG. 4 is a flowchart of an image data processing method according to some embodiments of the present application. As shown in FIG. 4, the image data processing method provided in these embodiments includes the steps below.

In step 401, an image is acquired.

In step 402, in the case where the image does not need to be segmented, the image is cached frame by frame.

In step 403, data of the image cached frame by frame is formed into data packets frame by frame and the data packets are sent.

In the solution provided in these embodiments, the image data is processed frame by frame. Compared with processing data line by line, processing data frame by frame focuses on processing the data of one frame, thereby improving the bandwidth utilization.

In some embodiments, frame-by-frame caching includes: for data of each frame, sequentially writing data with a max burst length into a cache, and in the case where the length of remaining data is less than the max burst length, writing the remaining data with the actual length into the cache. That is, for the data of one frame, the data with the max burst length is written into the cache each time until the entire data of the frame is written into the cache. In some cases, the length of the data written last time is less than the max burst length, so the remaining data with the actual length is written into the cache. Comparing with line-by-line caching, in the solution provided in these embodiments, in the case where the data of one frame is processed frame by frame, more bursts with a length equal to the max burst length exist (in some cases, the length of the last burst is less than the max burst length); in the case where the data of one frame is processed line by line, a burst with a length less than the max burst length may exist in each line. Therefore, frame-by-frame processing has higher bandwidth utilization.

In some embodiments, one frame of the acquired image includes multiple lines of data, and before frame-by-frame caching, the image is processed and the multiple lines of data is spliced into one frame of data. That is, for the data of each frame, the data of each line of from the second line to the last line is spliced to the end of the data of the previous line and invalid data is removed from the data (two cases exist: in the case where the invalid data exists in the data, the invalid data is removed; and if the invalid data does not exist in the data, the operation of removing the invalid data does not need to be performed). The actual number of pixels in each line is determined according to the pre-configured system parameters. In the case where the number of pixels in each line of data exceeds the preceding actual number of pixels, the excess pixels are the invalid data. The data of each line does not include the start of line and the end of line of this line.

In some embodiments, in the case where multiple lines of data are spliced into one frame of data, the invalid data in each line may not be removed, and the data of each line is directly spliced to the end of the data of the previous line. The invalid data is removed, thereby saving bandwidth resources and improving the bandwidth utilization.

In some embodiments, forming the data packets frame by frame includes: for data of each frame, sequentially forming the data packets with the maximum packet length supported by a transmission interface and in the case where the length of remaining data is less than the maximum packet length, forming a data packet with the actual length of the remaining data. Comparing with line-by-line processing, in the case where the data of one frame is processed by adopting the solution provided in these embodiments, more data packets with the maximum packet length exist (in some cases, the packet length of the last data packet is less than the maximum packet length); in the case where the data of one frame is processed line by line, a data packet with a packet length less than the maximum packet length may exist in each line. Therefore, frame-by-frame processing has higher bandwidth utilization. The transmission interface is, for example, PCIe, and the data packets are TLPs. However, the embodiments of the present application are not limited thereto, in some embodiments, the transmission interface is another transmission interface, and the data packets are other types of data packets.

In some embodiments, the method further includes: in the case where the image needs to be segmented, caching the image line by line; and forming data of the image cached line by line into data packets line by line and sending the data packets. In the solution provided in these embodiments, the image that needs to be segmented is cached line by line, thereby facilitating segmenting.

In some embodiments, the method further includes the following: after the image is cached, the data of the image carries indication information, and the indication information indicates a manner in which the image is processed, where the processing method includes frame-by-frame processing or line-by-line processing. In some embodiments, the indication information is directly carried indication information (for example, different carried marks indicate different processing manners, the marks are, for example, a preset flag bit, and different values of the preset flag bit represent different processing manners), or the indication information is implicit (for example, carrying a preset field represents one processing manner, and not carrying the preset field represents another processing manner).

The preceding image data processing method is applicable to the input boards of the splicing control system, but is not limited thereto.

Figure 5:
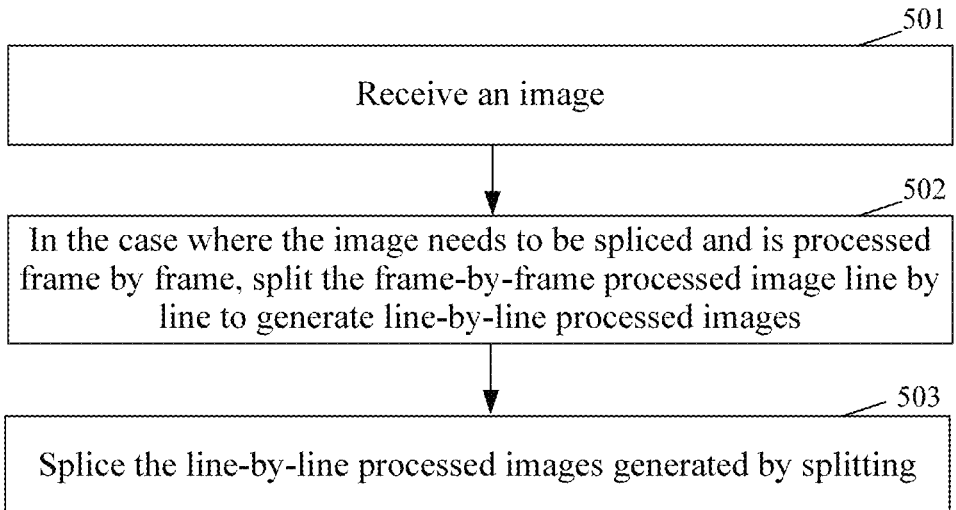
FIG. 5 is a flowchart of another image data processing method according to some embodiments of the present application.

FIG. 5 is a flowchart of another image data processing method according to some embodiments of the present application. As shown in FIG. 5, the image data processing method provided in the embodiment of the present application includes the steps below.

In step 501, an image is received.

In step 502, in the case where the image needs to be spliced and is processed frame by frame, the frame-by-frame processed image is split line by line to generate line-by-line processed images.

In step 503, the line-by-line processed images generated by splitting are spliced.

In the solution provided in these embodiments, the image processed frame by frame is received, thereby improving the bandwidth utilization.

In some embodiments, splitting the frame-by-frame processed image line by line includes the steps below.

Data of one frame of the image is split line by line, where for data of any line, in the case where data of the current line includes data of the next line, the data that is in the current line and belongs to the next line is moved to the frontmost end of the next line; and the start of line and the end of line are added to the data of each line.

For example, the pixels corresponding to the last clock of the current line include the pixels of the next line, and the pixels that are in the last clock and belong to the next line are moved to the frontmost end of the next line.

For example, the actual number of pixels in each line is determined according to the pre-configured system parameters.

In some embodiments, the method further includes determining whether the image is processed frame by frame or line by line according to indication information carried in the image. For example, the indication information is acquired from a frame header packet. However, the embodiments of the present application are not limited thereto. It is determined whether the image is processed frame by frame or line by line according to the received data packets.

In some embodiments, the method further includes: in the case where the image needs to be spliced and is processed line by line, splicing the image. That is, the image processed line by line is be directly spliced. In the solution provided in these embodiments, line-by-line and frame-by-frame mixed processing is achieved, thereby facilitating image splicing and improving the bandwidth utilization.

In some embodiments, the spliced image is sent to a display module for display.

The preceding image data processing method is applicable to the output boards of the splicing control system, but is not limited thereto.

Figure 6:
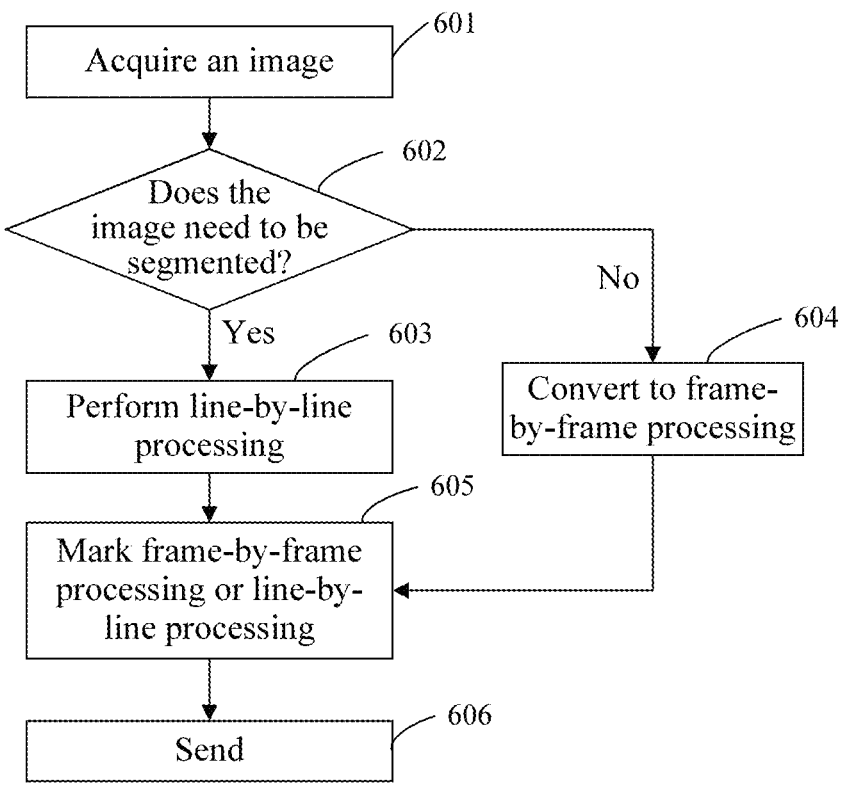
FIG. 6 is a flowchart of another image data processing method according to some embodiments of the present application.

FIG. 6 is a flowchart of another image data processing method according to some embodiments of the present application. As shown in FIG. 6, in these embodiments, the external interfaces such as the DDR SDRAM and PCIe are used for caching and sending the image data. However, the embodiments of the present application are not limited thereto and in some embodiments, other external interfaces are used. The image data processing method includes the steps below.

In step 601, an image is acquired.

In step 602, whether the image needs to be segmented is determined. If the image needs to be segmented, step 603 is performed. If the image does not need to be segmented, step 604 is performed.

In step 603, the image is cached line by line. Step 605 is performed.

For example, the DDR SDRAM is used for caching.

Caching the image line by line includes: in units of lines, sequentially writing cache data with the max burst length in a line, and in the case where the length of the remaining data is less than the max burst length, writing the cache data with the actual length. That is, the length of the last burst in a line is the length of the remaining data, and the length of a burst before the last burst is the max burst length.

Figure 7:
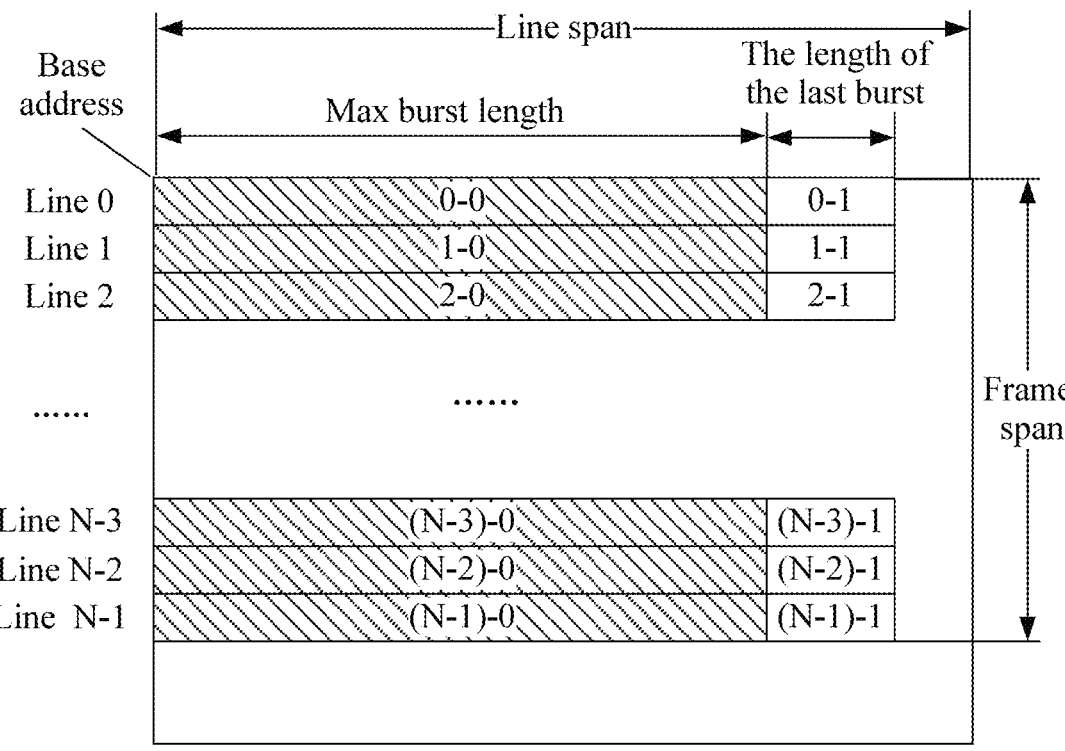
FIG. 7 is a schematic diagram of caching line by line according to some embodiments of the present application.

In some embodiments, as shown in FIG. 7, the data of Line 0 may include two bursts 0-0 and 0-1, where the data length of burst 0-0 is the max burst length, burst 0-1 is the last burst, and the length of burst 0-1 is the actual length of the remaining data after the data of burst 0-0 is subtracted from the data of Line 0. Subsequent Line 1 to Line N-1 are similar to Line 0, and the details are not repeated. FIG. 7 is merely an example, and the embodiments of the present application are not limited thereto. One line may include multiple bursts with the max burst length.

In step 604, the image is cached frame by frame through Double Data Rate (DDR) caching. Step 605 is performed.

Caching the image frame by frame through DDR caching includes the step below.

The data of the image is spliced, and the spliced data is written into the cache.

For a video with a certain image resolution, four pixels are processed per clock (this is merely an example, and the solution provided in the embodiment of the present application is applicable to the solution in which other numbers of pixels are processed per clock). The image resolution is not necessarily a multiple of four, so invalid pixels may exist in four pixels at the end of each line of the image. To be compatible with the image resolution, four pixels are processed per clock. The processing flow is described below.

Figure 8:
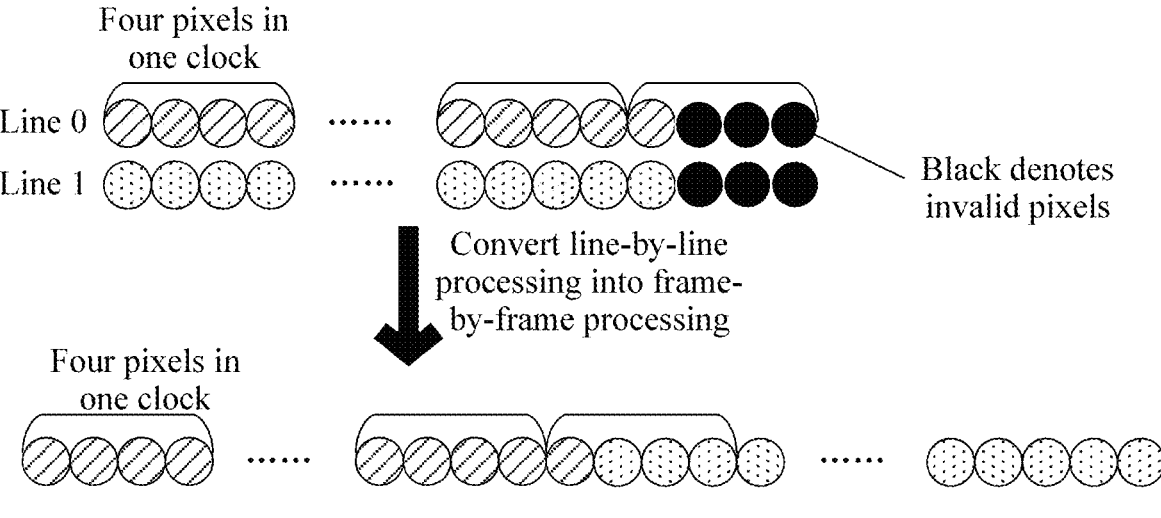
FIG. 8 is a schematic diagram of converting an image processed line by line into an image processed frame by frame according to some embodiments of the present application.

Whether the invalid pixels at the end of line need to be removed is determined. If the invalid pixels at the end of line need to be removed, the invalid pixels are removed according to the number of invalid pixels at the end of line that need to be removed. If the invalid pixels at the end of line do not need to be removed, removing is not performed. Starting from the second line, the data of each line is spliced to the end of the data of the previous line as shown in FIG. 8 until the last line, thereby generating the spliced data.

Figure 9:
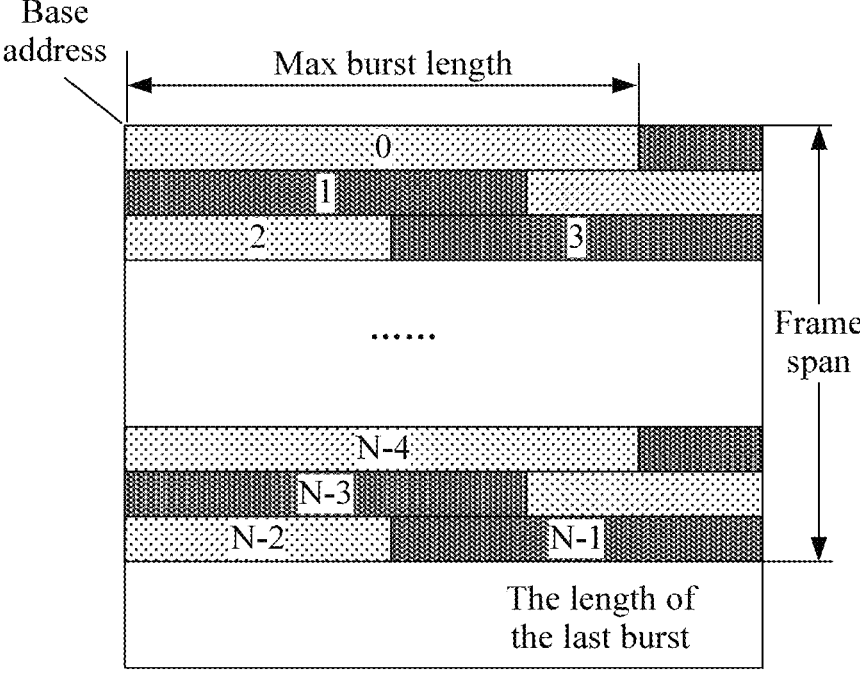
FIG. 9 is a schematic diagram of frame-by-frame caching according to some embodiments of the present application.

Writing the spliced data into the cache includes: in units of frames, sequentially writing the data with the max burst length in one frame into the cache, and in the case where the length of the remaining data in one frame is less than the max burst length, writing the remaining data with the actual length into the cache. That is, the length of the last burst in one frame is the length of the remaining data, and the length of a burst before the last burst is the max burst length. In the case where the length of the data of one frame is an integer multiple of the max burst length, the length of the last burst is the max burst length. As shown in FIG. 9, the data of one frame includes burst 0 to burst N-2 with the max burst length and burst N-1 with the length of the remaining data in one frame. In some embodiments, the burst number N here is the same as the number of lines N included in the preceding image. However, the embodiments of the present application are not limited thereto, and the burst number is other values.

In step 605, marking processing is performed according to the caching method, and the marking processing indicates the caching method of the image, where the caching method includes line-by-line processing or frame-by-frame processing. For example, in the case where the image is cached line by line, a first mark indicating that the image is cached line by line is added; and in the case where the image is cached frame by frame, a second mark indicating that the image is cached frame by frame is added. In some embodiments, a mark is added in the case where the image is cached line by line, and no mark is carried in the case where the image is cached frame by frame (that is, no mark indicates that the image is cached frame by frame); or a mark is carried in the case where the image is cached frame by frame, and no mark is carried in the case where the image is cached line by line (that is, no mark indicates that the image is cached line by line). In some embodiments, the mark is carried in a frame header packet (not the preceding frame header), the data of each frame corresponds to one frame header packet, and the data of each frame is one frame of data processed frame by frame or multiple lines of one frame of data processed line by line.

In step 606, the data of the image is formed into TLPs, and the TLPs are sent to the output boards.

In some embodiments, the TLPs are sent to the output boards through PCIe.

In some embodiments, forming the data of the image into the TLPs may include the step below.

In the case where the data of the image is processed line by line, the TLPs are generated in units of lines, and the data in each line is packetized sequentially according to the maximum TLP packet length. In the case where the length of the remaining data in one line is less than the maximum TLP packet length, the remaining data is packetized according to the actual data length. Therefore, the length of the last burst in each line may not be the maximum TLP packet length. In some embodiments, in the case where the image is relatively small and the length of the data of each line is relatively small, one TLP exist in each line, and the packet length of the TLP is much less than the maximum TLP packet length.

Figure 10:
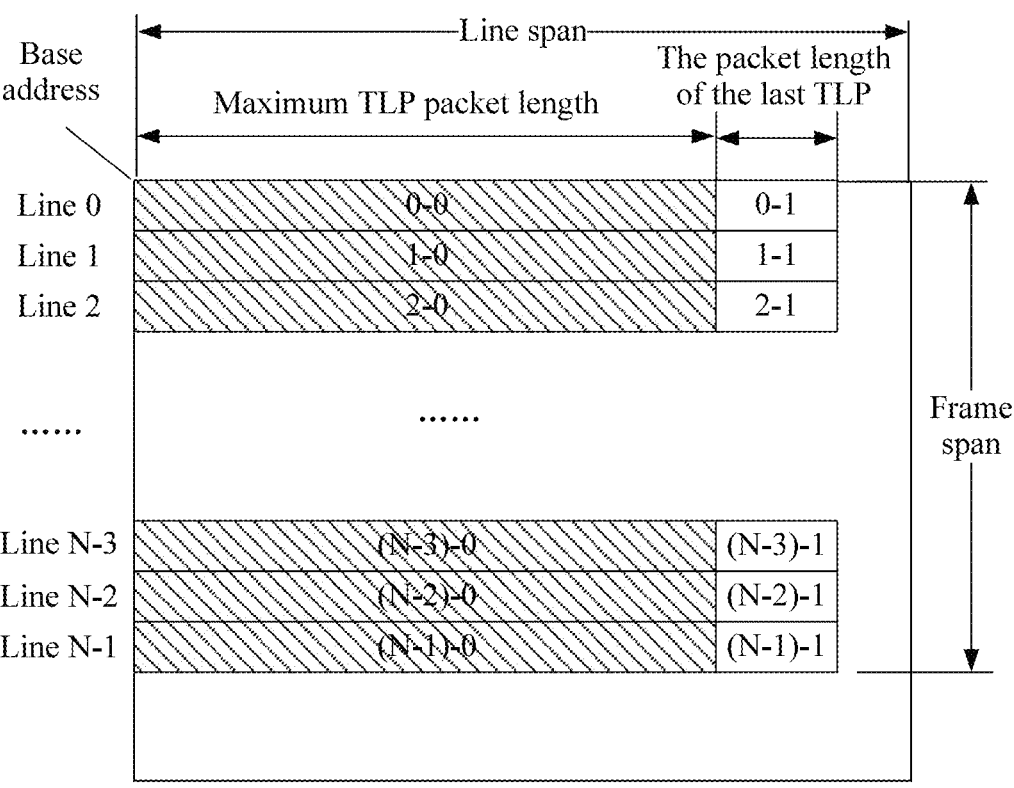
FIG. 10 is a schematic diagram of forming TLPs line by line according to some embodiments of the present application.

FIG. 10 is a schematic diagram of forming TLPs line by line according to some embodiments of the present application. As shown in FIG. 10, in these embodiments, each line includes two TLPs, one packet length is the maximum TLP packet length, and the other packet length is the length of the data in the line minus the maximum TLP packet length. However, the embodiments of the present application are not limited thereto. In the case where more data exists in each line, each line may include more TLPs.

Figure 11:
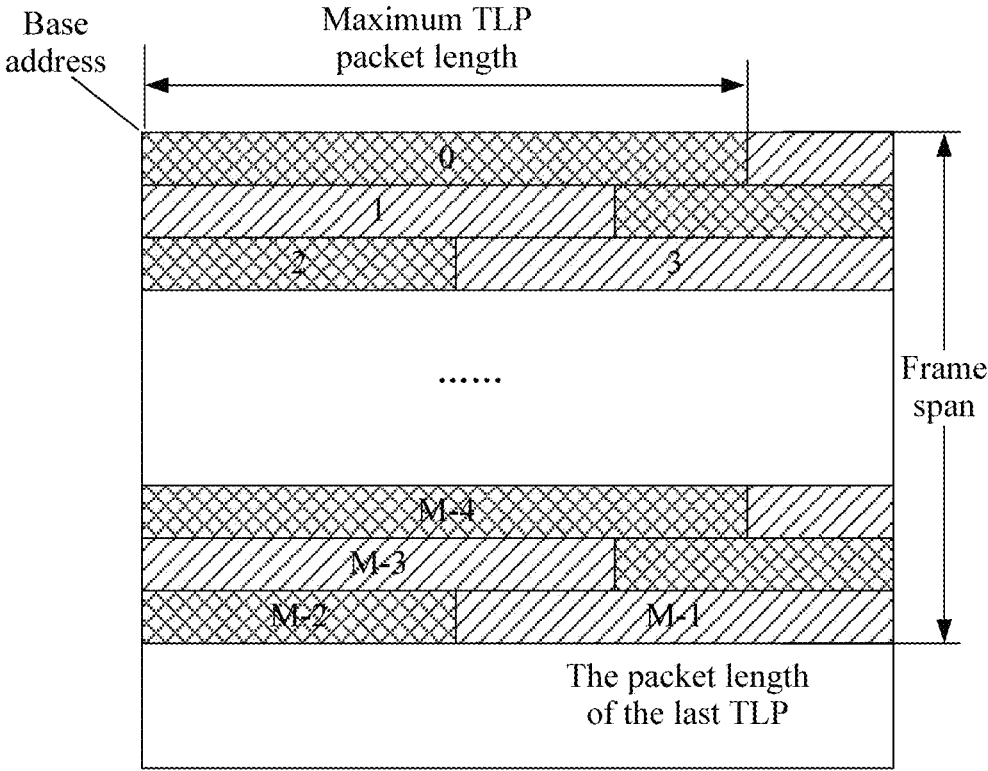
FIG. 11 is a schematic diagram of forming TLPs frame by frame according to some embodiments of the present application.

In the case where the data of the image is processed frame by frame, the TLPs are generated in units of frames, and the data of each frame is packetized sequentially according to the maximum TLP packet length. In the case where the length of the remaining data in one frame is less than the maximum TLP packet length, the last TLP is formed according to the actual data length, and TLP 0, TLP 1, TLP 2, . . . , TLP M-4, TLP M-3, TLP M-2, and TLP M-1 are sent to the output boards sequentially, where M denotes the number of TLPs in one frame. In the method of forming TLPs frame by frame, in some cases, the length of the last TLP in one frame is not the maximum TLP packet length, and other TLPs are packetized according to the maximum TLP packet length. As shown in FIG. 11, the lengths of TLP 0 to TLP M-2 are the maximum TLP packet length, and the length of TLP M-1 is the actual length of the remaining data in one frame. However, the embodiments of the present application are not limited thereto. In the case where the length of the data of one frame is an integer multiple of the maximum TLP packet length, the packet length of the last TLP is the maximum TLP packet length.

In the solution provided in these embodiments, in the case where the image does not need to be segmented, the image is be processed frame by frame, thereby making full use of the bandwidth, improving the bandwidth utilization, and improving the product performance; moreover, in the case where the image needs to be segmented, the image is be processed line by line, thereby facilitating segmenting. When the solution provided in these embodiments is applied to the splicing control system, line-by-line and frame-by-frame mixed processing is performed, which has the advantages of facilitating image segmenting and image splicing and improves the bandwidth utilization of the external interface.

Figure 12:
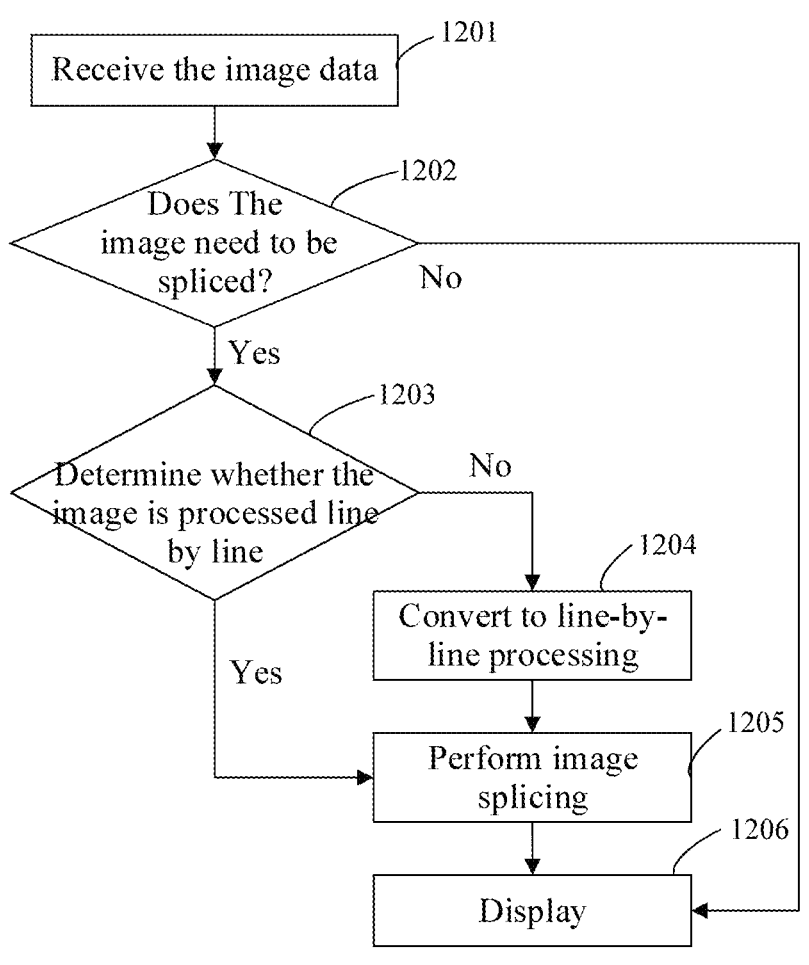
FIG. 12 is a flowchart of another image data processing method according to some embodiments of the present application.

FIG. 12 is a flowchart of another image data processing method according to some embodiments of the present application. As shown in FIG. 12, the image data processing method provided in these embodiments is applicable to the output boards and includes the steps below.

In step 1201, the image data sent by the input boards is received.

For example, the data sent by the input boards is received through PCIe.

In step 1202, whether the image needs to be spliced is determined. If the image needs to be spliced, step 1203 is performed. If the image does not need to be spliced, step 1206 is performed.

For example, whether the image needs to be spliced is determined according to the pre-configured system parameters.

In step 1203, it is determined whether the image is processed line by line or frame by frame according to the mark in the image data. If the image is processed line by line, step 1205 is performed. If the image is processed frame by frame, step 1204 is performed.

In step 1204, the data processed frame by frame is converted into the data processed line by line.

In some embodiments, converting the data processed frame by frame into the data processed line by line includes the steps below.

Figure 13:
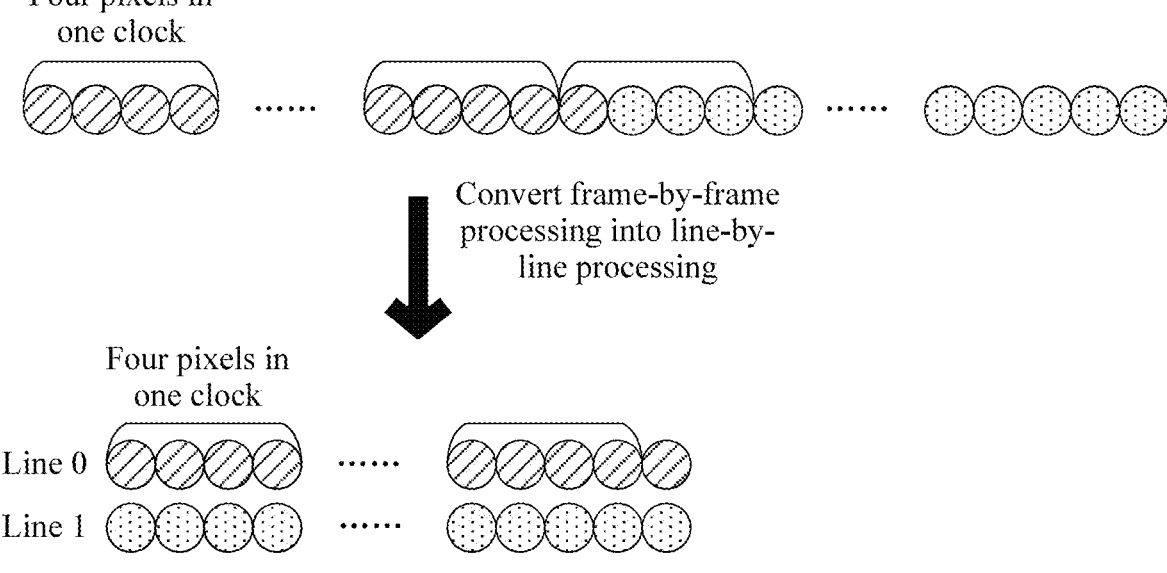
FIG. 13 is a schematic diagram of converting an image processed frame by frame into an image processed line by line according to some embodiments of the present application.

The data of one frame is split line by line, and the start of line and the end of line are added to each line. During splitting, whether the pixels of the current line are spliced because the number of pixels of the last clock of the previous line is less than four is determined. If the pixels of the current line are spliced because the number of pixels of the last clock of the previous line is less than four, pixel splitting is performed according to the number of pixels to be split. If the pixels of the current line are spliced not because the number of pixels of the last clock of the previous line is less than four, pixel splitting does not need to be performed. As shown in FIG. 13, the last three pixels of Line 0 belong to Line 1. During splitting, the three pixels are moved to the frontmost end of Line 1.

In step 1205, image splicing is performed.

Here, the received image processed line by line is spliced, or the image processed line by line converted in step 1204 is spliced.

The splicing is performed according to the pre-configured system parameters.

In step 1206, the image that does not need to be spliced or the spliced image is sent to the display module for display.

In the solution provided in these embodiments, the bandwidth utilization efficiency of the external interfaces (such as the DDR SDRAM and PCIe) is improved, the image fluency are improved, and the product competitiveness is improved.

The solution provided in the embodiment of the present application is applicable to the splicing control system, but is not limited thereto. The solution may apply to other systems.

Figure 14:
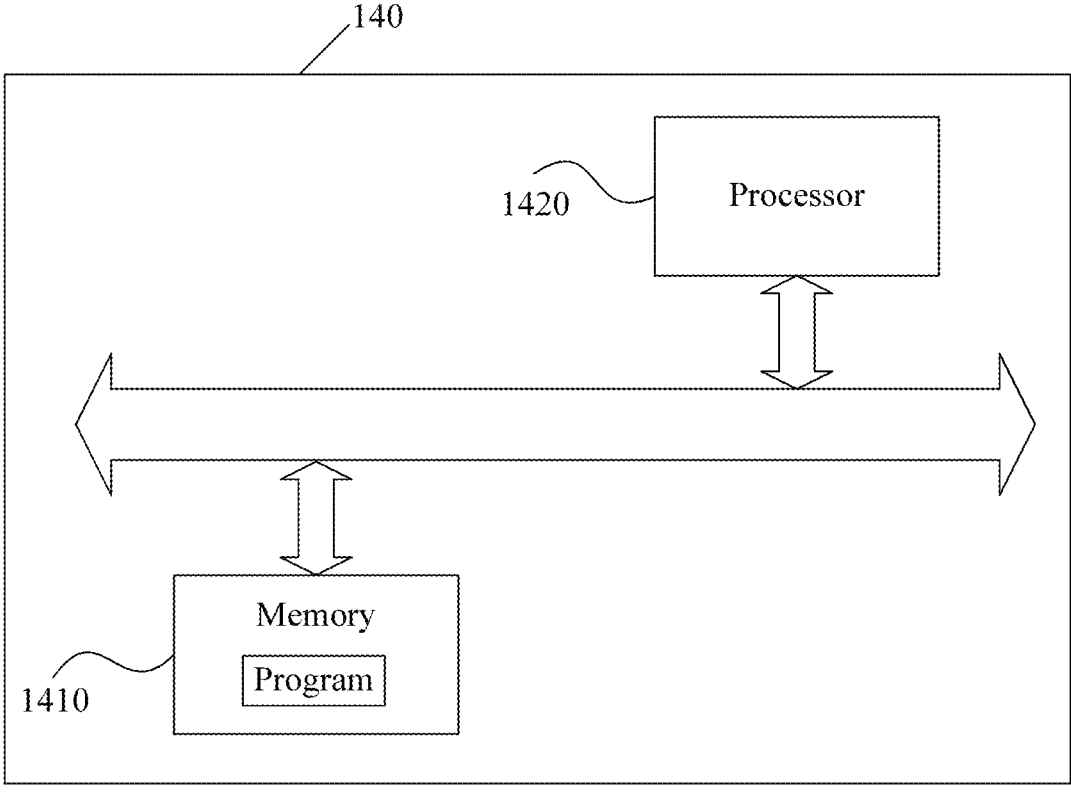
FIG. 14 is a schematic diagram of an image data processing apparatus according to some embodiments of the present application.

As shown in FIG. 14, the embodiment of the present application provides an image data processing apparatus 140. The image data processing apparatus 140 includes a memory 1410 and a processor 1420, where the memory 1410 stores programs, and the programs, when read and executed by the processor 1420, cause the processor 1420 to perform the image data processing method according to any of the preceding embodiments.

The embodiments of the present application provide a computer-readable storage medium. The computer-readable storage medium is configured to store one or more programs, where the one or more programs are executable by one or more processors to cause the one or more processors to perform the image data processing method according to any of the preceding embodiments.

It is to be understood by those of ordinary skill in the art that functional modules/units in all or part of the steps of the method, the system, and the apparatus disclosed above may be implemented as software, firmware, hardware, and appropriate combinations thereof. In the hardware embodiment, the division of the functional modules/units mentioned in the preceding description may not necessarily correspond to the division of physical assemblies. For example, one physical assembly may have multiple functions, or one function or step may be implemented jointly by several physical assemblies. Some or all assemblies may be implemented as software executed by processors such as digital signal processors or microprocessors, implemented as hardware, or implemented as integrated circuits such as application-specific integrated circuits. Such software may be distributed on a computer-readable medium, which may include a computer storage medium (or a non-transitory medium) and a communication medium (or a transitory medium). As is known to those of ordinary skill in the art, the term, computer storage medium, includes volatile and nonvolatile, removable and non-removable media implemented in any method or technology for storing information (such as computer-readable instructions, data structures, program modules, or other data). The computer storage medium includes, but is not limited to, a random-access memory (RAM), a read-only memory (ROM), an electrically erasable programmable read-only memory (EEPROM), a flash memory or other memory technologies, a compact disc read-only memory (CD-ROM), a digital video disc (DVD) or other optical disc storage, a magnetic cassette, a magnetic tape, magnetic disk storage or other magnetic storage apparatuses, or any other medium used for storing the desired information and accessible by a computer. In addition, as is known to those of ordinary skill in the art, the communication medium generally includes computer-readable instructions, data structures, program modules, or other data in modulated data signals such as carriers or other transmission mechanisms and may include any information delivery medium.

What is claimed is:

1. An image data processing method, comprising:
acquiring an image;
in a case where the image does not need to be segmented, caching the image frame by frame; and
forming data of the image cached frame by frame into data packets frame by frame and sending the data packets formed frame by frame.

2. The image data processing method of claim 1, wherein caching the image frame by frame comprises:
for data of each frame, sequentially writing data with a max burst length into a cache, and in a case where a length of remaining data is less than the max burst length, writing the remaining data with an actual length into the cache.

3. The image data processing method of claim 2, wherein one frame of the image comprises a plurality of lines of data, and before caching the image frame by frame, the method further comprises:
for the plurality of lines of data of each frame, splicing data of each of a second line to a last line of the plurality of lines to an end of data of a previous line of the each of the second line to the last line, wherein the plurality of lines of data is data without invalid data, and the each of the plurality of lines of data does not comprise a start of line and an end of line of the each of the plurality of lines.

4. The image data processing method of claim 1, wherein forming the data of the image cached frame by frame into the data packets frame by frame comprises:
for each frame of the data of the image cached frame by frame, sequentially forming the data packets with a maximum packet length supported by a transmission interface and in a case where a length of remaining data is less than the maximum packet length, forming a data packet with the length of the remaining data.

5. The image data processing method of claim 1, wherein the method comprises:
in a case where the image needs to be segmented, caching the image line by line; and
forming data of the image cached line by line into data packets line by line and sending the data packets formed line by line;
wherein the data of the cached image carries indication information, and the indication information indicates a manner in which the image is processed, wherein the manner comprises at least one of frame-by-frame processing or line-by-line processing.

6. An image data processing method, comprising:
receiving an image;
in a case where the image needs to be spliced and is processed frame by frame, splitting the frame-by-frame processed image line by line to generate line-by-line processed images; and
splicing the line-by-line processed images generated by splitting.

7. The image data processing method of claim 6, wherein splitting the frame-by-frame processed image line by line comprises:
determining a theoretical number of pixels per line according to pre-configured parameters, splitting data of one frame of the image into a plurality of lines according to the theoretical number of pixels per line, and for each line of the plurality of lines, determining that the line contains pixels belonging to a next line in response to an actual number X of pixels of the line being less than the theoretical number Y of pixels of the line;
splitting the pixels belonging to the next line to a front-most end of the next line, where the pixels belonging to the next line are the $(X+1)$-th pixel to the Y-th pixel of the line; and
adding a start of line and an end of line for the data of the line.

8. The image data processing method of claim 6, wherein the method comprises:
determining whether the image is processed frame by frame or line by line according to indication information carried in the image; and
in a case where the image needs to be spliced and is processed line by line, performing splicing for the image.

9. An image data processing apparatus comprising a memory and a processor, wherein the memory stores programs, and the programs, when read and executed by the processor, cause the processor to perform the following steps:
acquiring an image;
in a case where the image does not need to be segmented, caching the image frame by frame; and forming data of the image cached frame by frame into data packets frame by frame and sending the data packets formed frame by frame.

10. A non-transitory computer-readable storage medium storing at least one program, wherein the at least one program is executable by at least one processor to cause the at least one processor to perform the image data processing method of claim 1.

11. The image data processing method of claim 2, wherein the method comprises:

in a case where the image needs to be segmented, caching the image line by line; and forming data of the image cached line by line into data packets line by line and sending the data packets formed line by line;

wherein the data of the cached image carries indication information, and the indication information indicates a manner in which the image is processed, wherein the manner comprises at least one of frame-by-frame processing or line-by-line processing.

12. The image data processing method of claim 3, wherein the method comprises:

in a case where the image needs to be segmented, caching the image line by line; and forming data of the image cached line by line into data packets line by line and sending the data packets formed line by line;

wherein the data of the cached image carries indication information, and the indication information indicates a manner in which the image is processed, wherein the manner comprises at least one of frame-by-frame processing or line-by-line processing.

13. The image data processing method of claim 4, wherein the method comprises:

in a case where the image needs to be segmented, caching the image line by line; and forming data of the image cached line by line into data packets line by line and sending the data packets formed line by line;

wherein the data of the cached image carries indication information, and the indication information indicates a manner in which the image is processed, wherein the manner comprises at least one of frame-by-frame processing or line-by-line processing.

14. An image data processing apparatus comprising a memory and a processor, wherein the memory stores programs, and the programs, when read and executed by the processor, cause the processor to perform the image data processing method of claim 6.

15. A non-transitory computer-readable storage medium storing at least one program, wherein the at least one program is executable by at least one processor to cause the at least one processor to perform the image data processing method of claim 6.

16. The image data processing apparatus of claim 9, wherein caching the image frame by frame comprises:

for data of each frame, sequentially writing data with a max burst length into a cache, and in a case where a length of remaining data is less than the max burst length, writing the remaining data with an actual length into the cache.

17. The image data processing apparatus of claim 16, wherein one frame of the image comprises a plurality of lines of data, and before caching the image frame by frame, the apparatus comprises:

for the plurality of lines of data of each frame, splicing data of each of a second line to a last line of the plurality of lines to an end of data of a previous line of the each of the second line to the last line, wherein the plurality of lines of data is data without invalid data, and the each of the plurality of lines of data does not comprise a start of line and an end of line of the each of the plurality of lines.

18. The image data processing apparatus of claim 9, wherein forming the data of the image cached frame by frame into the data packets frame by frame comprises:

for each frame of the data of the image cached frame by frame, sequentially forming the data packets with a maximum packet length supported by a transmission interface and in a case where a length of remaining data is less than the maximum packet length, forming a data packet with the length of the remaining data.

19. The image data processing apparatus of claim 9, wherein the processor further performs the following steps:

in a case where the image needs to be segmented, caching the image line by line; and forming data of the image cached line by line into data packets line by line and sending the data packets formed line by line;

wherein the data of the cached image carries indication information, and the indication information indicates a manner in which the image is processed, wherein the manner comprises at least one of frame-by-frame processing or line-by-line processing.

20. The image data processing apparatus of claim 14, wherein splitting the frame-by-frame processed image line by line comprises:

determining a theoretical number of pixels per line according to pre-configured parameters, splitting data of one frame of the image into a plurality of lines according to the theoretical number of pixels per line, and for each line of the plurality of lines, determining that the line contains pixels belonging to a next line in response to an actual number X of pixels of the line being less than the theoretical number Y of pixels of the line;

splitting the pixels belonging to the next line to a front-most end of the next line, where the pixels belonging to the next line are the (X+1)-th pixel to the Y-th pixel of the line; and adding a start of line and an end of line for the data of the line.

* * * * *